Sept. 12, 1961
J. G. IMPARATO
2,999,291
CLAMP WITH RELATIVELY ADJUSTABLE
ARTICLE ENGAGING MEMBERS
Filed May 22, 1959
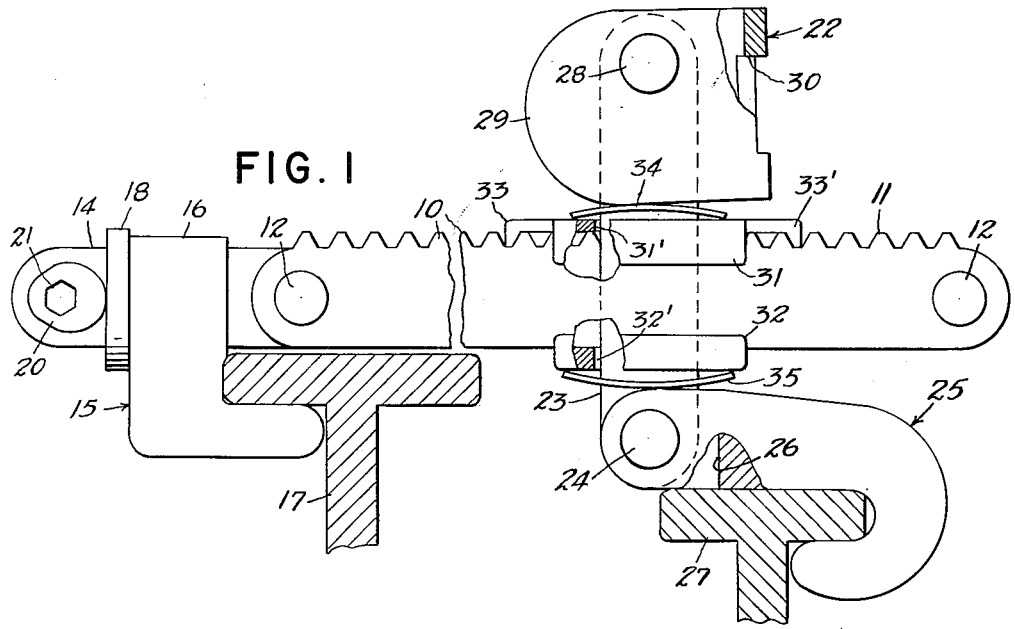
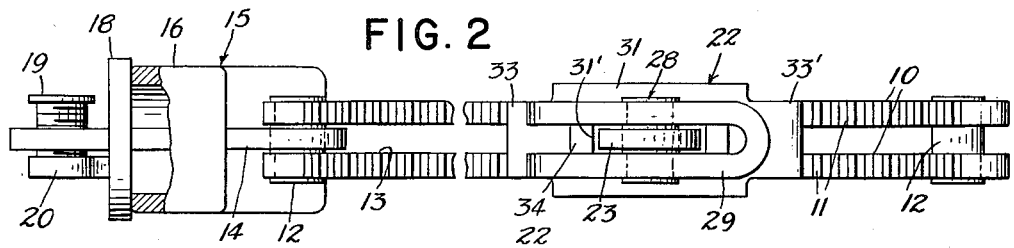
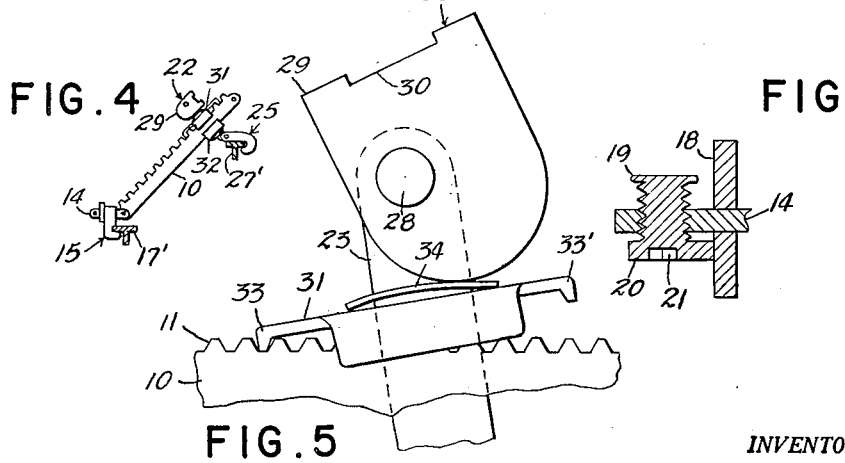
INVENTOR.
JACK G. IMPARATO
BY
Howard E. Thompson
ATTORNEY

United States Patent Office 2,999,291
Patented Sept. 12, 1961

2,999,291
CLAMP WITH RELATIVELY ADJUSTABLE
ARTICLE ENGAGING MEMBERS
Jack G. Imparato, 1121 82nd St., Brooklyn, N.Y.
Filed May 22, 1959, Ser. No. 815,067
8 Claims. (Cl. 24—263)

This invention relates to clamps designed primarily for coupling articles of different sizes one with the other to retain the same against relative shifting in the shipment and handling thereof.

More particularly, the invention deals with a clamp employing a pair of article engaging members, with means for adjustably spacing the members one with respect to the other, each of the members having a pivotal mounting, and at least one of said members having an added movement for shifting the position of said member with respect to the bar of the clamp.

Still more particularly, the invention deals with a clamp of the character described, wherein one of said members includes means for definitely clamping the same in an adjusted position on said bar.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic side and sectional view of one of my improved clamps, with parts of the construction broken away and in section and indicating portions of two articles engaged by the clamp, part of the bars being broken away.

FIG. 2 is a plan view of the structure shown in FIG. 1, omitting the articles and with part of the construction broken away and in section.

FIG. 3 is a sectional detail view showing one of the adjustments of the clamp.

FIG. 4 is a rough diagrammatic view illustrating the arrangement of a clamp in engaging workpieces of different sizes, parts of the workpieces being indicated in section; and FIG. 5 is a detail view, generally similar to FIG. 1, diagrammatically illustrating, in part, the method of initially positioning the clamp preparatory to movement of the same into locked position.

My improved clamp comprises a pair of bars 10 having longitudinally of one edge thereof, the upper edge as shown in FIG. 1 of the drawing, rack teeth 11. End portions of the bars are coupled and spaced by rivets 12 to form a longitudinal channel 13 between the bars. The rivet 12, at one end of the bars, forms a pivot for a link 14, on which is slidably and rotatably mounted one substantially hook-shaped article engaging member 15. The member 15 includes a tubular portion 16 facilitating complete rotation of the member 15 around the link 14 for universal coupling of the member 15 with an article as, for example, the sectional portion of an article indicated at 17 in FIG. 1 and indicated at 17' in FIG. 4.

Arranged upon the outer end portion of the link 14 is a back-up disc or washer 18, position of which on the link 14 is adjustably controlled by a screw 19 rotatable in the link and having an eccentric 20 operatively engaging the disc 18. The outer surface of the eccentric 20 includes a socket 21 facilitating rotation of the screw 19 by a suitable wrench.

Adjustable longitudinally of the bars 10 is a clamping unit 22. The unit comprises a rod 23 slidably mounted in the channel 13. Pivoted to one end of the rod 23, as seen at 24, is another article engaging hook-shaped member 25, the pivot end of the member 25 being fork-shaped in form, as indicated at 26 in FIG. 1 of the drawing, to receive the end of the rod 23. The member 25 is adapted to engage another article, shown partly in section at 27 in FIG. 1 and at 27' in FIG. 4. In this connection, it will be understood that the position or arrangement of the parts 17 and 27 in FIG. 1 are different from that illustrated in FIG. 4 in order to simplify the illustration on the single sheet of drawing. The diagrammatic showing of FIG. 4 is included to illustrate the possibility of the clamp engaging articles of different dimensions. It will be understood, however, that the degree of difference can vary and, in some instances, articles of the same dimensions can also be coupled together with one of my improved clamps.

Pivotally supported upon the other end of the rod 23, as seen at 28, is an operating and locking cam 29, generally U-shaped in form, as clearly noted in FIG. 2 of the drawing, and the crosshead of the cam 29 has an aperture 30 therein for attachment of an operating tool or handle, not shown, for movement of the cam 29 from an inoperative position, as diagrammatically illustrated in FIG. 5, to the operative or clamped position, as shown in FIG. 1.

Arranged on the rod 23 are two flanged clamp plates 31 and 32, the plates being apertured to freely receive the rod 23, as indicated at 31' and 32' in FIG. 1 of the drawing.

The plate 31 is arranged upon the rack side of the bars 10 and this plate has, at its ends, extending hook-shaped or tooth portions 33, 33' to operatively engage the teeth of the rack 11.

Between the plate 31 and the cam 29 is disposed a flat spring 34 and a similar spring is disposed between the plate 32 and the member 25, as seen at 35. These springs provide a tensional engagement of the clamp unit 22 with the bars 10.

In the use of the clamp, the hook members 15 and 25 are placed in engagement with two spaced articles as, for example, 17, 27 in FIG. 1; 17', 27' in FIG. 4, with the clamp unit 22 in open position; whereupon, one of the tooth ends, for example, the end 33 of the plate 31, is placed in one of the teeth of the rack 11 with the clamp unit 22 substantially in the position diagrammatically illustrated in FIG. 5; whereupon, the cam 29 is rotated to force the plate 31 downwardly into engagement with the bars 10 and, in this operation, it will be apparent that the members 15 and 25 will be moved toward each other and into firm clamping engagement with the articles 17, 27; 17', 27'. This operation will be preferably performed with the eccentric 20 at its low point adjacent the disc 18, thus if the engagement of the members 15, 25 with the articles is not a firm engagement, it will be understood that the eccentric can then be operated to bring the eccentric surface into operative engagement to draw 15 and 25 closer together, the eccentric being shown in this position in FIG. 1 of the drawing. It will also be apparent that, if in the initial setting of the plate 31 on the bars 10 the operator finds it impossible to draw the clamp unit 22 into fully closed position, then the plate 31 will be re-set in another tooth of the racks 11 to facilitate the clamping engagement. In this way, a firm coupling of articles can be accomplished.

The pivotal mounting of the member 25 on the rod 23 and the pivot of the link 14 facilitates movement of the members 15 and 25 into different angular positions with respect to the bars 10 and rotatable mounting of the member 15 also facilitates positioning these members in different angular relationships to each other. In other words, in the showing of FIG. 1, the hook portions of the members 15, 25 are both on the underside of the bar. 15 could be in any position circumferentially of the bars by virtue of its rotatable mounting on the link 14.

Having fully described my invention, what I claim as new and desire to secure by Letters Patent is:

1. A clamp comprising a rack bar portion, a link pivotally mounted to one end thereof, a hook-shaped article engaging member mounted on and movable longitudinally and rotatably on said link, a clamp unit supported on and adjustable longitudinally on said rack bar portion, said unit including a rod arranged substantially at right angles to said rack bar portion, a second hook-shaped article engaging member pivotally supported on one end of said rod, said clamp unit including a pair of clamp plates movable longitudinally on said rod, and a cam pivoted to the other end portion of said rod for moving said clamp plates into operative engagement with said rack bar portion.

2. A clamp comprising a rack bar portion, a link pivotally mounted to one end thereof, a hook-shaped article engaging member mounted on and movable longitudinally and rotatably on said link, a clamp unit supported on and adjustable longitudinally on said rack bar portion, said unit including a rod arranged substantially at right angles to said rack bar portion, a second hook-shaped article engaging member pivotally supported on one end of said rod, said clamp unit including a pair of clamp plates movable longitudinally on said rod, a cam pivoted to the other end portion of said rod for moving said clamp plates into operative engagement with said rack bar portion, said rack bar portion comprising a pair of bars, means spacing the bars one from the other to form a channel therebetween, and the rod of said unit operating in said channel.

3. A clamp comprising a rack bar portion, a link pivotally mounted to one end thereof, a hook-shaped article engaging member mounted on and movable longitudinally and rotatably on said link, a clamp unit supported on and adjustable longitudinally on said rack bar portion, said unit including a rod arranged substantially at right angles to said rack bar portion, a second hook-shaped article engaging member pivotally supported on one end of said rod, said clamp unit including a pair of clamp plates movable longitudinally on said rod, a cam pivoted to the other end portion of said rod for moving said clamp plates into operative engagement with said rack bar portion, said rack bar portion comprising a pair of bars, means spacing the bars one from the other to form a channel therebetween, the rod of said unit operating in said channel, and one of said clamp plates including, at its ends, tooth portions operatively engaging the racks of said bars.

4. A clamp comprising a rack bar portion, a link pivotally mounted to one end thereof, a hook-shaped article engaging member mounted on and movable longitudinally and rotatably on said link, a clamp unit supported on and adjustable longitudinally on said rack bar portion, said unit including a rod arranged substantially at right angles to said rack bar portion, a second hook-shaped article engaging member pivotally supported on one end of said rod, said clamp unit including a pair of clamp plates movable longitudinally on said rod, a cam pivoted to the other end portion of said rod for moving said clamp plates into operative engagement with said rack bar portion, said rack bar portion comprising a pair of bars, means spacing the bars one from the other to form a channel therebetween, the rod of said unit operating in said channel, one of said clamp plates including, at its ends, tooth portions operatively engaging the racks of said bars, and springs disposed between the second named article engaging member and one of said clamp plates and between said cam and the other of said clamp plates.

5. A clamp comprising a rack bar portion, a link pivotally mounted to one end thereof, a hook-shaped article engaging member mounted on and movable longitudinally and rotatably on said link, a clamp unit supported on and adjustable longitudinally on said rack bar portion, said unit including a rod arranged substantially at right angles to said rack bar portion, a second hook-shaped article engaging member pivotally supported on one end of said rod, said clamp unit including a pair of clamp plates movable longitudinally on said rod, a cam pivoted to the other end portion of said rod for moving said clamp plates into operative engagement with said rack bar portion, and means at the free end portion of said link for adjusting the position of the first named article engaging member on said link.

6. A clamp comprising a rack bar portion, a link pivotally mounted to one end thereof, a hook-shaped article engaging member mounted on and movable longitudinally and rotatably on said link, a clamp unit supported on and adjustable longitudinally on said rack bar portion, said unit including a rod arranged substantially at right angles to said rack bar portion, a second hook-shaped article engaging member pivotally supported on one end of said rod, said clamp unit including a pair of clamp plates movable longitudinally on said rod, a cam pivoted to the other end portion of said rod for moving said clamp plates into operative engagement with said rack bar portion, means at the free end portion of said link for adjusting the position of the first named article engaging member on said link, and said last named means comprising an eccentric adjustably supported in the link.

7. A clamp of the class described, comprising a pair of hook-shaped article engaging members, an elongated straight rack bar portion for adjustably spacing the members one from the other, a clamp unit comprising a rod, a pair of plates slidable on said rod, means movable on one end portion of the rod to move the plates into clamping engagement with said rack bar portion, one plate having means for keying the same to said rack bar portion, one of said members being pivoted to the other end portion of said rod, and means for supporting the other of said members on one end of said rack bar portion to control position thereof with respect to the first named member.

8. A clamp of the class described, comprising a pair of hook-shaped article engaging members, an elongated straight rack bar portion for adjustably spacing the members one from the other, a clamp unit comprising a rod, a pair of plates slidable on said rod, means movable on one end portion of the rod to move the plates into clamping engagement with said rack bar portion, one plate having means for keying the same to said rack bar portion, one of said members being pivoted to the other end portion of said rod, means for supporting the other of said members on one end of said rack bar portion to control position thereof with respect to the first named member, and said last named means including means for adjusting the last named member longitudinally with respect to said rack bar portion.

References Cited in the file of this patent

UNITED STATES PATENTS

| | | |
|---|---|---|
| 1,221,894 | Neeley | Apr. 10, 1917 |
| 1,750,819 | Schaller | Mar. 18, 1930 |
| 2,285,928 | Jensen | June 9, 1942 |
| 2,529,686 | Green | Nov. 14, 1950 |
| 2,610,070 | Klein | Sept. 9, 1952 |
| 2,708,121 | May | May 10, 1955 |
| 2,778,084 | Imparato | Jan. 22, 1957 |
| 2,874,432 | Derrick | Feb. 24, 1959 |

FOREIGN PATENTS

| | | |
|---|---|---|
| 620,072 | France | Jan. 12, 1927 |